United States Patent [19]

Hoag et al.

[11] Patent Number: 4,686,680
[45] Date of Patent: Aug. 11, 1987

[54] GAS LASER HAVING IMPROVED CROSSFLOW BLOWER ARRANGEMENT

[75] Inventors: Ethan Hoag, East Boston; Glenn Zeiders, Marblehead, both of Mass.

[73] Assignee: Laser Corporation of America, Lowell, Mass.

[21] Appl. No.: 748,505

[22] Filed: Jun. 25, 1985

[51] Int. Cl.[4] .................................................. H01S 3/22
[52] U.S. Cl. ........................................... 372/58; 372/55
[58] Field of Search ............................. 372/58, 55, 90

[56] References Cited

U.S. PATENT DOCUMENTS 4,206,429  6/1980  Pinsley ................................. 372/58

Primary Examiner—Gene Wan

[57] ABSTRACT

A gas laser of the type in which gas is impelled transversely through a region where lasing of the flowing gas occurs, employs a crossfield blower to propel the gas around a closed loop. The crossfield blower has an elongate impeller that is substantially the same length as the lasing region. The impeller generates at least one vortex in the gas flow. A part of that vortex is situated outside the path of the main gas flow to the lasing region. To remove heat from the gas without appreciably interfering with the main gas flow to the lasing region, cooling means are situated in that part of the vortex that is outside the path of the main gas flow to the lasing region.

3 Claims, 9 Drawing Figures

GAS LASER HAVING IMPROVED CROSSFLOW BLOWER ARRANGEMENT

FIELD OF INVENTION

This invention relates in general to lasers of the type using a flowing gas as the lasing medium. More particularly, the invention pertains to gas lasers of the kind employing a crossflow blower to propel the flowing gas.

BACKGROUND OF THE INVENTION

In a laser of the kind employing flowing gas as the lasing medium, the gas flows through a discharge cavity where an electric field causes an electric discharge in the gas that produces an emission of light. The amount of light produced is related to the volume of gas that can be made to lase. In moderate and high power gas lasers, the volume of gas that can be made to lase is increased by propelling the gas through the discharge region at high velocity. In high power gas lasers, the gas flow may exceed sonic velocity. To conserve gas, it is conventional to cause the gas to be recirculated in a closed system and to add gas to replace lost gas.

Lasing of the gas causes the gas to become very hot and the gas flowing out of the discharge cavity, therefore, is at a much high temperature than the gas entering the discharge cavity. In a closed system where the gas is recirculated, the hot gas from the discharge cavity flows to a heat exchanger where the gas is cooled to restore the population of gas molecules to levels that are appropriate for again permitting the stimulation of lasing. The cooled gas is then accelerated to increase its velocity and the gas is again directed into the discharge region for the stimulation of lasing.

In gas lasers of the kind in which the gas flows transversely through the discharge region, it is usual to employ a crossflow blower as the device for propelling the gas around its recirculatory path. The crossflow blower is especially suited for use in the transverse flow gas laser because the length of the blower's impeller can be matched to the length of the discharge region.

The crossflow fan appears to have been invented by Mortier in the 1890's and is described in his U.S. Pat. No. 507,445 which was granted in 1893. An improvement on the crossflow fan is disclosed in Datwyler's U.K. Pat. No. 988,712. In that improved fan, the vortex is free to move circumferentially around the fan and the vortex thus is able to adjust its position to prevailing flow conditions. For a discussion on the crossflow fan, see the monograph titled "A Study Of The Cross Flow Fan" by A. M. Porter and E. Markland in the Journal of Mechanical Engineering Science, Vol. 12, No. 6, 1970. That monograph is here incorporated by reference.

U.S Pat. No. 4,099,143 describes a flowing gas laser of the transverse gas flow type having a gas tight cylindrical housing enclosing a crossflow blower, a heat exchanger and means forming a discharge region, together with baffles and vanes for causing the gas to flow in a closed loop. In that arrangement, the crosssflow blower extends longitudinally within the housing along substantially the same length as the discharge region. Consequently, the blower propels the gas transversely through the discharge region along the entire longitudinal extent of that region. In the arrangement disclosed in the patent, the crossflow blower and its baffles are disposed in accordance with conventional practice.

It has been found that the throughput (i.e. the volume of flow) of the crossflow blower is adversely affected where the inlet flow conditions or the outlet flow conditions or both are such as to cause throttling of the flow to occur inside the blower's impeller. Throttling occurs where the center of the vortex generated by the blower is inside the impeller's cage, as described in the Porter and Markland monograph. To assure proper inlet flow conditions, the velocity of the inlet flow must be high enough to prevent the inlet flow from hugging the interior circumference of the impeller's cage. That is, where the velocity of the inlet flow, after once passing through the blades of the impeller, is too low, the flow tends to hug the inside circumference of the cage formed by the blades of the impeller.

It is known from the technical literature that a well behaved crossflow blower generates two vortices and that the main throughput flow of the blower passes between those vortices through a channel bounded by the separation streamlines. The exact location and shape of those vortices are subject to external factors such as ducting and back pressure and in general are not known.

OBJECTS OF THE INVENTION

The primary object of the invention is to obtain proper performance of the crossflow blower employed in a flowing gas laser by insuring that the inlet and outlet conditions do not cause throttling of the gas flow through the impeller of the blower.

Another object of the invention is to eliminate or reduce the adverse effects of an upstream heat exchanger on the gas flow produced by a crossflow blower employed in a flowing gas laser.

A further object of the invention is to eliminate the need for an upstream heat exchanger in a flowing gas laser while enabling the heat added to the gas by the work of a crossflow blower to be removed by cooling means situated outside the main gas flow on the outlet side of the blower.

THE DRAWINGS

FIG. 1 is a perspective view of the housing which encloses the internal structures of the laser.

FIG. 2 schematically shows a conventional arrangement of structures inside the laser housing.

FIG. 3 is a longitudinal view of the interior of the laser housing that schematicaly shows the position of the crossflow blower in relation to the discharge region of the laser.

FIG. 4 schematically shows the extent of the inflow and outflow regions of a conventionally arranged crossflow blower.

FIG. 5 schematically shows an improved arrangement of the crossflow blower within the laser housing.

FIG. 6 is a diagram showing gas flow through the impeller blades of the crossflow blower.

FIG. 7 schematically shows the flow produced by the crossflow blower in the FIG. 5 arrangement.

FIG. 8 schematically shows the preferred embodiment of the invention in which the upstream heat exchanger has been entirely eliminated and cooling is accomplished by cooling the gas flow in the vortices produced by the crossflow blower.

FIG. 9 schematically shows a hybrid arrangement of the structures within the laser housing in which removal of the heat generated by the work of the crossflow blower is performed in part by cooling the gas in the vortice produced by the crossflow blower and in part by an upstream heat exchanger situated in the main flow of the gas.

DETAILED DESCRIPTION OF INVENTION EMBODIMENTS

Figure 1:
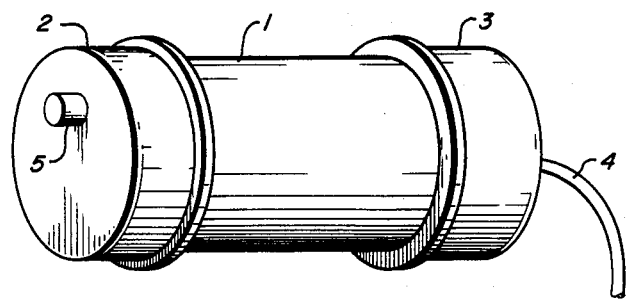

Referring now to FIG. 1 of the drawings, there is shown a laser whose internal structures are situated in a gas tight enclosure formed by a hollow cylindrical housing 1 that is closed at one end by a cap 2 and is closed at its other end by a cap 3. Extending through end cap 3 is a flexible conduit 4 through which electrical power lines, water supply hoses, and other lines are brought into the housing without impairing the gas tight integrity of the enclosure. Protruding from end cap 2 is a cylindrical tube 5 in which is mounted the optically transparent window element through which the laser beam passes out of the gas tight enclosure.

Figure 2:
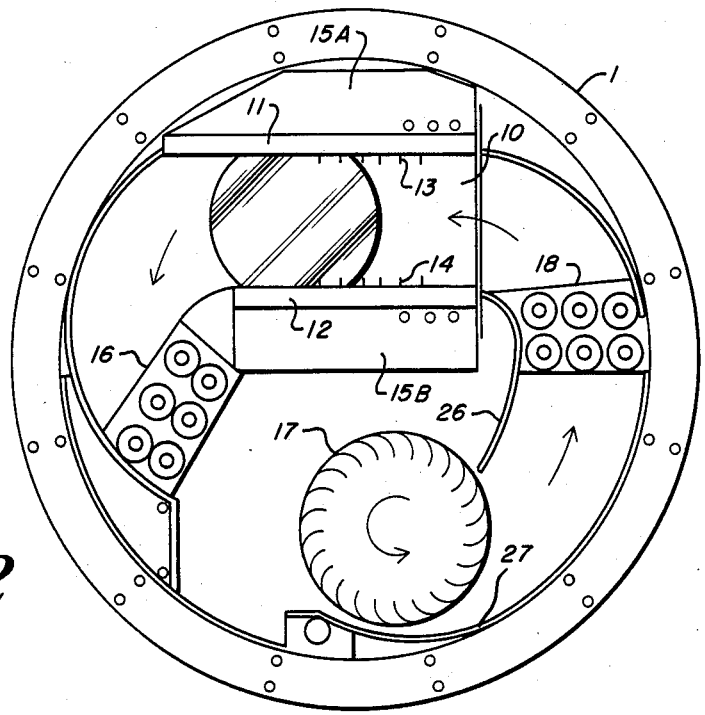

FIG. 2 of the drawing schematically shows a conventional arrangement of the structures inside the housing 1 of the laser. In the illustrated arrangement, the discharge region 10, in which lasing of the gas occurs is situated between two dielectric plates 11 and 12 made of a ceramic material such as cordierite which has a low coefficient of expansion and which can withstand high temperatures. Rows of electrodes 13 and 14 extend through the dielectric plates and establish an electric field that causes the gas in the discharge region to lase. Housed within ballast modules 15A and 15B are electrical components that are associated with the electrodes 13 and 14 that establish the electric field in the discharge region. Cooling elements may also be situated in the ballast modules. The hot gas leaving the discharge region flows through a downstream heat exchanger 16 which cools the gas to restore the population of gas molecules to the appropriate levels that permit the gas, when recirculated, to be again stimulated into lasing activity. The cooled gas then flows to the intake side of a crossflow blower 17. That device is sometimes referred to as a "squirrel cage" blower because its impeller has a single circular row of blades forming a cage that rotates about its central axis. The gas pressure at the outlet side of the crossflow blower is higher than the gas pressure at the inlet side. The crossflow blower compresses the gas and accelerates its velocity and in so doing heats the gas. To remove the heat added to the gas by the work of the crossflow blower, the gas from the outlet side of the blower is cooled by causing it to pass through an upstream heat exchanger 18 before the gas enters the discharge region 10.

The heat exchangers 16 and 18 may be of any convenient type, such as the conventional kind that employs water cooled tubes with multitudes of fins that increase the effective heat exchange surface area. The path of the gas flow in the FIG. 2 arrangement is indicated by arrows and it is evident that the gas circulates in a closed loop.

Figure 3:
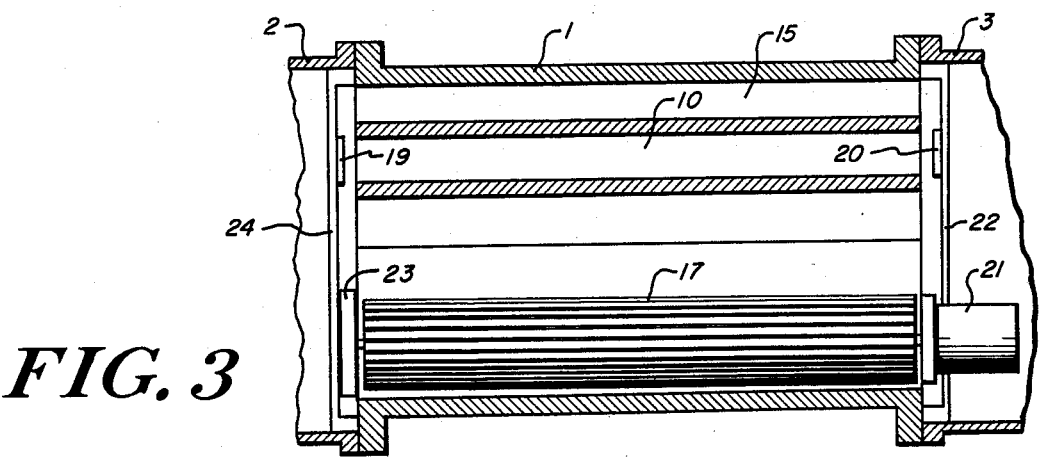

Referring now to FIG. 3, the optical elements 19 and 20 of the laser's resonant optical cavity are shown disposed at the ends of the discharge region 10. For clarity, optical element 19 of the resonator has been omitted in FIG. 2. The impeller of the crossflow blower 17 is substantially coextensive with the length of the discharge region 10 of the laser. The crossflow blower has a substantially uniform gas flow pattern over the entire longitudinal extent of the impeller and thus is able to propel the gas with uniform velocity transversely across the discharge region throughout that region's entire longitudinal extent. The impeller of the crossflow blower is driven by an electric motor 21 mounted on a support 22 attached to the housing 1. In a similar manner, the other end of the impeller of the crossflow blower is supported in a bearing 23 mounted on a support 24 secured to the housing.

Referring again to FIG. 2, it can be seen that the outlet flow of blower 17 is confined between a vortex wall 26 and a rear wall 27 which direct the gas flow toward the upstream heat exchanger 18. The primary function of that heat exchanger is to remove the heat added to the gas by the work of blower 17. Each heat exchanger is shown in FIG. 2 as employing two rows of water cooled pipes having fins to increase the effective heat exchange area. The heat exchanger 18 impedes the flow of gas by its "drag" that reduces the gas velocity. Obviously, the removal of the upstream heat exchanger from the flow path of the gas is a highly desirable objective if its removal can be achieved while enabling the heat added by the work of the blower to be removed from the gas.

Figure 4:
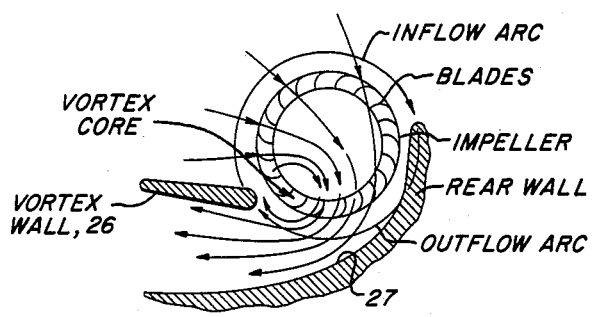

Referring now to FIG. 4, the impeller of the crossflow fan is shown together with vortex wall 26 and rear wall 27. It can be seen that the inflow can occur over a wide arc whereas the outflow is restricted to a much smaller arc. That is the conventional manner of employing a crossflow fan and is the arrangement depicted in FIG. 2.

Figure 5:
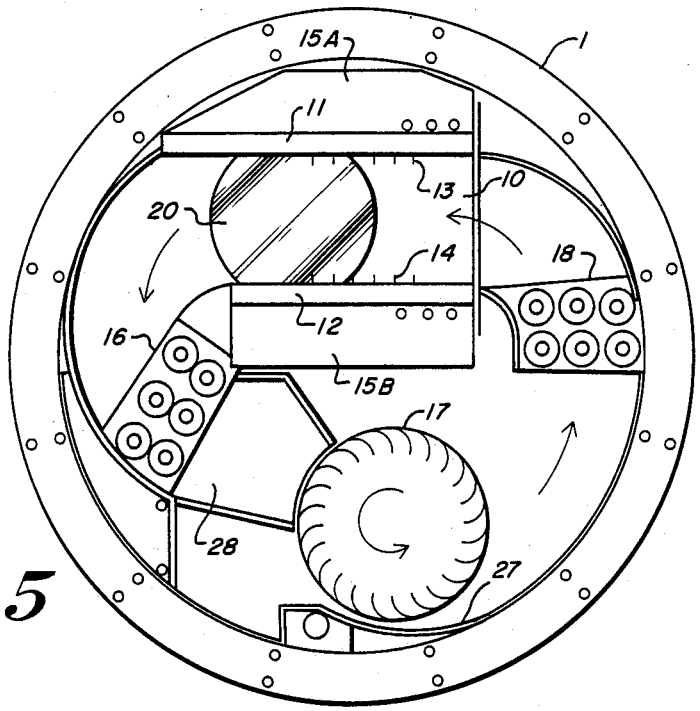

Referring now to FIG. 5, there is shown a modification of the FIG. 2 arrangement that results in improved performance. In the FIG. 5 arrangement, the inlet flow to the crossflow blower 17 is confined by a tapered nozzle 28 to a smaller sector of the periphery of the impeller. In addition, the vortex wall 26, shown in FIG. 2, has been removed. The tapered nozzle 28 increases the velocity of the gas flowing into crossflow blower.

Figure 6:
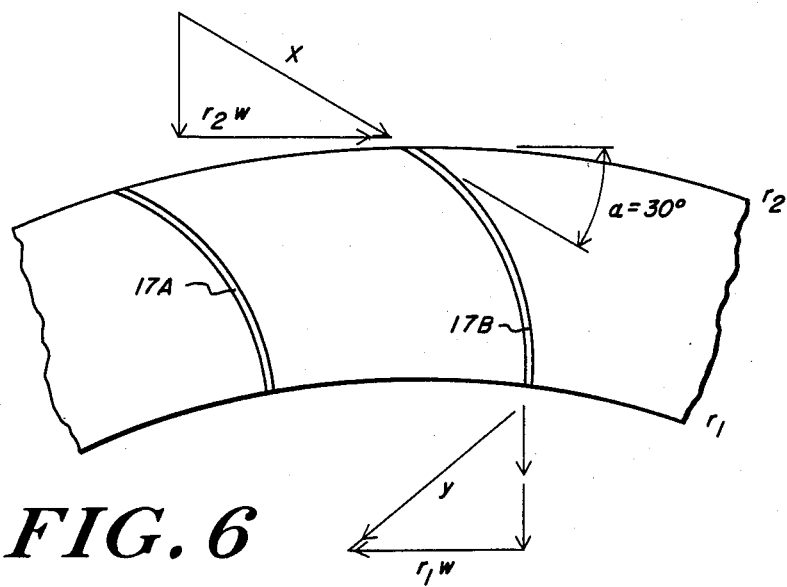

Referring now to FIG. 6, there is shown a portion of the impeller of a crossflow blower having blades 17A and 17B which are circular arcs. The ideal inlet gas flow is tangent to the top of the blades, as indicated in that figure by the arrow X, so that the ideal angle of attack is zero. Relative to the tangent to the outside periphery of the impeller, the angle $\alpha$ of 30° gives a zero angle of attack.

To prevent the inlet flow from hugging the internal circumference of the impeller, the exit velocity $V_1$ of the gas must have sufficient radial velocity to cause the gas to flow substantially in the direction indicated by the arrow Y.

The tapered nozzle 28, in addition to confining the inlet flow to the crossflow blower 17 causes the inlet flow angle of attack to approach the ideal and also, because of the taper, increases the inlet velocity.

Figure 7:
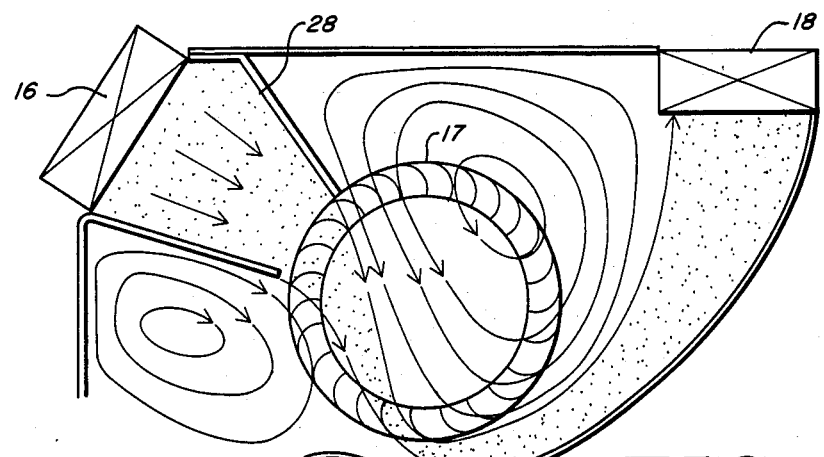

Referring now to FIG. 7, there is schematically shown the result of increasing the velocity of the inlet flow and confining the inlet flow to a smaller sector of the impeller's circumference. The main flow through the impeller is in a channel between the separation streamlines indicated in FIG. 7. That main flow channel in the impeller is confined by two vortices, one of which has its center on the impeller blades. The nozzle 28 tapers to a width that is approximately the same as the height of the channel through the electric discharge region.

The major portion of the heat generated in the fan's compression of the gas, is generated in the two vortices and not in the throughput flow of the main channel. In the FIG. 2 arrangement, all the heat generated in vortices must diffuse into the main flow before being removed by the upstream heat exchanger.

Figure 8:
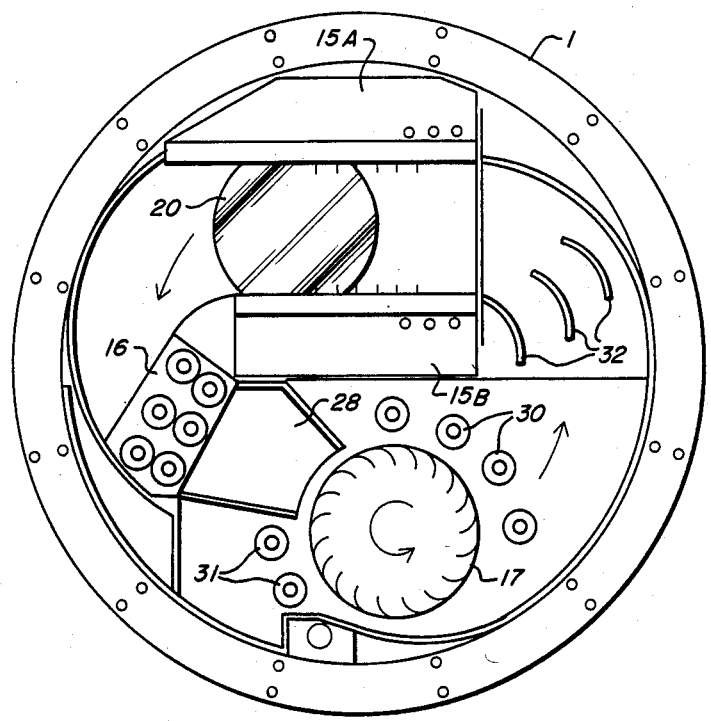

Referring now to FIG. 8, there is schematically shown the preferred arrangement of the internal structures of the laser. In that preferred embodiment of the invention, the upstream heat exchanger has been entirely eliminated. Cooling to remove the heat generated by the crossflow blower is provided by finned cooling tubes 30 and 31 disposed in the path of the gas circulating in the two vortices. The tubes 30 are positioned in the path of one vortex and the tubes 31 are positioned in a the path of the other vortex. The placement of the cooling tubes and the number of those tubes can, of course, be varied to provide the requisite cooling. Further, the placement, size, and number of those cooling tubes can be adjusted to minimize or eliminate any undesired effects on the throughput of the main flow channel.

The tapered nozzle 28 shown in FIG. 8 can be made of sheet metal or of any other suitable sheet material. If desired, curved vanes 32 may be employed to smoothly turn the flow of gas into the discharge region.

Figure 9:
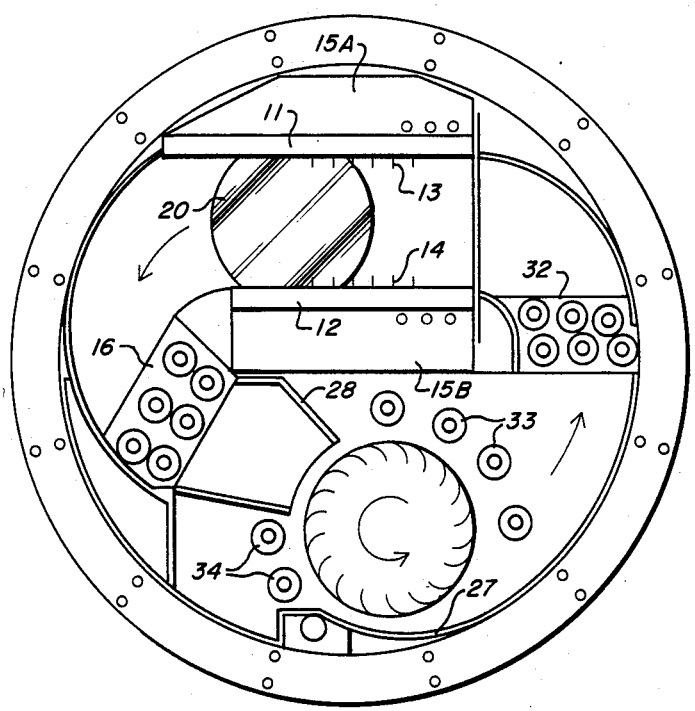

FIG. 9 schematically shows a hybrid embodiment of the invention that retains the upstream heat exchanger while utilizing the improved crossflow blower arrangement of FIG. 8. In the FIG. 9 embodiment, some of the heat added by blower 17 is removed by upstream heat exchanger 32. However to lessen the back pressure of heat exchanger 32, the impedance to gas flow through that exchanger is greatly reduced by using water cooled tubes that offer little resistance to the gas flow. The major part of the heat added by blower 17 is, in the FIG. 9 arrangement, removed by the finned cooling pipes 33 and 34 which are disposed in the path of the vortices. Because some of the heat load is carried by the upstream heat exchanger, the heat load on cooling pipes 33 and 34 is reduced and consequently fewer of those cooling pipes need be employed.

Inasmuch as the invention can be embodied in various forms, it is not intended that the scope of the invention be limited only to the embodiments herein described. Rather, it is intended that the scope of the invention be construed in accordance with the appended claims, having due regard for obvious changes that do not alter the essential features of the invention.

We claim:

1. In a flowing gas laser of the type having a gas tight enclosure in which are situated
   (a) means forming an electric discharge region in which lasing of the gas occurs,
   (b) downstream heat exchanger means for cooling the gas after it has passed through the discharge region,
   (c) a crossflow blower having an impeller that is substantially coextensive with the longitudinal extent of the discharge region, the crossflow blower propelling the gas around a closed loop within the enclosure, and
   (d) cooling means for removing heat from the gas added by the work of the crossflow blower,
   the improvement wherein
      the cooling means for removing heat from the gas added by the work of the crossflow blower comprises cooling means disposed outside the blower's impeller in the path of at least one of the vortices generated by the blower whereby at least some of the added heat is removed outside of the main gas flow to the discharge region from gas flowing in a vortex.

2. In a flowing gas laser of the type having a gas tight enclosure in which are situated
   (a) means forming an electric discharge region in which lasing of the gas occurs,
   (b) downstream heat exchanger means for cooling the gas after it has passed through the discharge region,
   (c) a crossflow blower having an impeller that is substantially coextensive with the longitudinal extent of the discharge region, the crossflow blower propelling the gas around a closed loop within the enclosure, and
   (d) cooling means for removing heat from the gas added by the work of the crossflow blower,
   the improvement wherein
      the cooling means for removing heat from the gas added by the work of the crossflow blower are disposed outside the blower's impeller in the paths of the vortices generated by the blower whereby the removal of heat occurs outside of the main gas flow to the electric discharge region from gas flowing in the vortices.

3. In a flowing gas laser of the type having a gas tight enclosure in which are situated
   (a) means forming an electric discharge region in which lasing of the gas occurs,
   (b) downstream heat exchanger means for cooling the gas after it has passed through the discharge region,
   (c) a crossflow blower having an impeller that is substantially coextensive with the longitudinal extent of the discharge region, the crossflow blower propelling the gas around a closed loop within the enclosure, and
   (d) cooling means for removing heat from the gas added by the work of the crossflow blower,
   the improvement comprising
      a tapered nozzle disposed between the downstream heat exchanger means and the inlet to the crossflow blower, the tapered nozzle causing the velocity of the inflowing gas to be at least 50% of the impeller's velocity at the interior periphery of the impeller's blades.

* * * * *